W. GEIST.
CONVEYER.
APPLICATION FILED MAR. 25, 1920.

1,433,366. Patented Oct. 24, 1922.

Inventor
W. Geist
by
Attorney

Patented Oct. 24, 1922.

1,433,366

UNITED STATES PATENT OFFICE.

WALTER GEIST, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CONVEYER.

Application filed March 25, 1920. Serial No. 369,396.

*To all whom it may concern:*

Be it known that WALTER GEIST, a citizen of the United States, residing at Milwaukee, in the county of Milwaukee and State of Wisconsin, has invented a certain new and useful Improvement in Conveyers, of which the following is a specification.

This invention relates in general to improvements in the formation and operation of conveyers, and relates more specifically to improvements in the construction of rotary screw conveyers of the type especially adapted to transport granular or pulverulent material along a conduit or trough.

An object of the invention is to provide a screw conveyer which is simple in construction and efficient in operation. Another object is to provide a screw conveyer the helical flight of which is formed in sections which are readily adjustable to reverse the direction of transportation of the material being acted upon. Still another object is to provide means for facilitating the construction and adjustment of sectional screw conveyers of the reversible type. A further object is to provide a sectional screw conveyer which may be formed of sheet metal and with the aid of dies, thereby enabling construction of the conveyer sections in quantity and at minimum cost. A further object is to provide a screw conveyer in which the successive sections are of identical formation, thus making the various similar parts interchangeable. Another object is to provide simple and efficient means for attaching the flight sections of a screw conveyer to the central drive element thereof, such securing means also permitting rapid removal of the flight sections from the drive elements. These and other objects of the invention and the manner in which they are attained, will be apparent from the following description.

A clear conception of several embodiments of the invention may be had by referring to the drawing accompanying and forming a part of this specification, in which like reference characters designate the same or similar parts in the various views.

Figure 2:
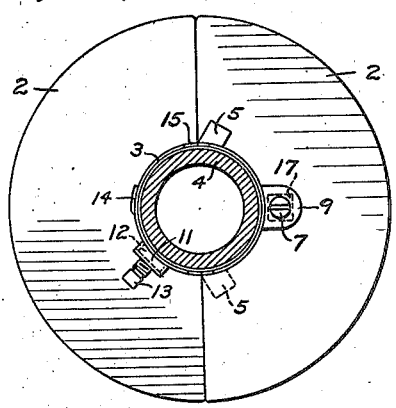
Fig. 2 is an end view of the conveyer shown in Fig. 1.

The screw conveyer element to which the present invention relates, comprises in general a central driving shaft ordinarily consisting of a piece of gas pipe 4, a series of end coacting tubular members 3, 30, 31 embracing and secured to the pipe 4, and a series of reversely positioned flight sections or blades 2 associated one with each of the tubular members 3, 30, 31 and forming a substantially continuous helical flight extending longitudinally of the pipe 4. This conveyer element forms the rotor of the conveyer and is disposed within a stationary trough or conduit the walls of which are located adjacent to the periphery of the helical flight formed by the blades 2. As this rotor is caused to revolve within the conduit or trough, material admitted to the path of the helical flight, will be transported from end to end of the conveyer, the direction of transportation depending upon the setting of the blades 2 and the diretion of rotation of the rotor.

In the forms of conveyer disclosed in Figs. 1 to 6 inclusive, the tubular members 3, 30 are each provided with a pair of diametrically opposite end projections 15 adapted to engage similarly formed recesses 18 in the ends of the adjacent members 3, 30 respectively, in order to properly relatively position the successive tubular members. Each of the tubular members 3, 30 is constructed of a substantially rectangular sheet metal blank which after being properly punched and distorted, is rolled into tubular shape and has its abutting ends connected by means of spot welds at the overlapping projections 14 which are provided for such connection. Each of the tubular members 3, 30 is also provided with a distorted portion forming a hollow boss 11 within which is located a nut 12. The members 3, 30 after being positioned upon the pipe 4 as illustrated, are locked in position by means of set screws 13 co-operating with the nuts 12 in the bosses 11. The successive members 3 are identical in construction, as are also the successive members 30.

Figure 1:
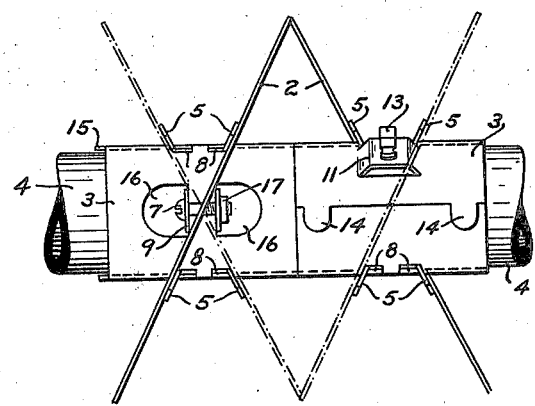
Fig. 1 is a side elevation of several successive sections of a screw conveyer showing the flight sections detachably associated with the central driving element of the conveyer.
Figure 3:
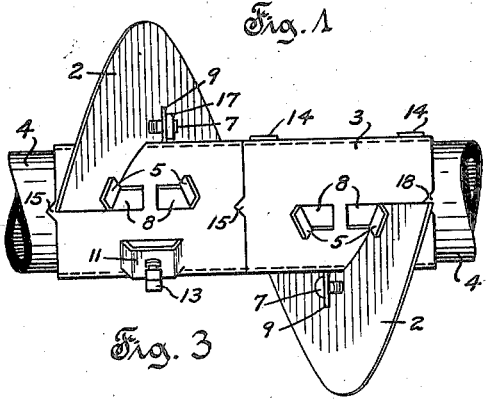
Fig. 3 is a bottom view of the conveyer disclosed in Figs. 1 and 2.

Referring specifically to Figs. 1, 2 and 3, the sheet metal tubular members 3 are each provided with a set of inner parallel ears 9 extending substantially perpendicular to the longitudinal axis of the member 3, these ears being formed by punching out and distorting the body of the tubular member 3 at the openings 16. Each of the tubular members 3 is further provided with two sets each comprising a pair of parallel outer ears 5, extending at oblique angles relatively to the axis of the tubular member 3. These ears 5 are formed by punching out and distorting the body of the tubular member 3 at the openings 8. The ears 5, 9 form oppositely facing definitely spaced abutments adapted to engage and to position the blades 2. The blades 2 are likewise formed of sheet metal and of substantially semi-circular formation and having their inner portions cut away to engage the tubular members 3. The sheet metal blades 2 are interchangeably associable with the sets of ears 5 as shown in full and dot and dash lines in Fig. 1. With a blade 2 properly positioned, the end portions coact with the abutments formed by the ears 5 while the medial portion of the blade lies between the abutments formed by the ears 9. The ears 9 and the adjacent medial portion of the blade 2 are provided with alined openings within which is located a clamping screw 7. Associated with the clamping screw 7 is a nut 17 which in conjunction with the screw 7 is adapted to draw the ears 9 inwardly toward the blade 2 and to hold the blade 2 firmly in position. The successive sections of the conveyer are of identical structure but are angularly advanced 180° relatively to each other about the axis of the pipe 4. With the blades 2 positioned as shown in full lines in Fig. 1, rotation of the conveyer in a given direction will advance the material in a predetermined direction longitudinally of the pipe 4. With the blades positioned as shown in dot and dash lines in Fig. 1, rotation of the conveyer in the same direction will urge the material in the opposite direction longitudinally of the pipe 4.

Figure 6:
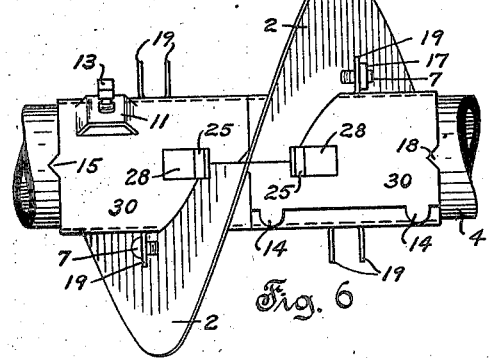
Fig. 6 is a top view of the conveyer shown in Figs. 4 and 5.
Figure 4:
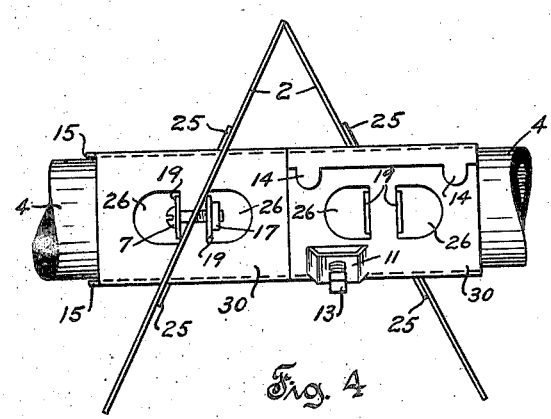
Fig. 4 is a side elevation of another form of sectional screw conveyer, showing several successive sections thereof each having a flight section detachably associated with a central driving element.
Figure 5:
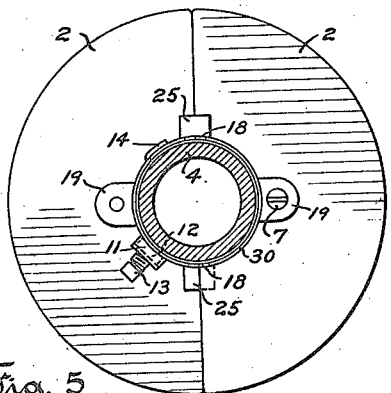
Fig. 5 is an end view of the conveyer shown in Fig. 4.

Referring specifically to Figs. 4, 5 and 6, the sheet metal tubular members 30 are each provided with diametrically opposite sets of inner parallel ears 19 extending substantially perpendicular to the longitudinal axis of the member 30, these ears being formed by punching out and distorting the body of the tubular member 30 at the openings 26. Each of the tubular members 30 is further provided with a set of diametrically opposite parallel outer ears 25 extending at right angles relatively to the axis of the tubular member 30. These ears 25 are formed by punching out and distorting the body of the tubular member 30 at the openings 28. The ears 19, 25 again form oppositely facing definitely spaced blade positioning abutments. The blades 2 are identical with those disclosed in Figs. 1 to 3 inclusive and are interchangeably associable with opposite ends of the ears 25 and with the diametrically opposite sets of inner ears 19. With a blade 2 properly positioned to transport material in one direction for a given direction of rotation, the end portions of the blade coact with corresponding halves of the ears 25 and the medial portion of the blade lies between the set of ears 19 on the side of the tubular member 30 adjacent to the halves of the ears 25 which are engaged. With the blade 2 properly positioned for urging material in the opposite direction for the same direction of rotation, the end portions of the blade coact with the opposite corresponding halves of the ears 25 while the medial portion of the blade lies between the diametrically opposite ears 19. The medial portion of the blade 2 is provided with an opening which with the blade properly positioned between a set of ears 19, is in alinement with openings in the ears 19. These alined openings are again adapted to receive a clamping screw 7 which co-operating with a nut 17 is adapted to draw the ears 19 inwardly toward the blade and to hold the blade firmly in position. As in the preceding case, the successive tubular members of the conveyer are identical in structure, being again angularly advanced 180° relatively to each other about the axis of the pipe 4.

Figure 7:
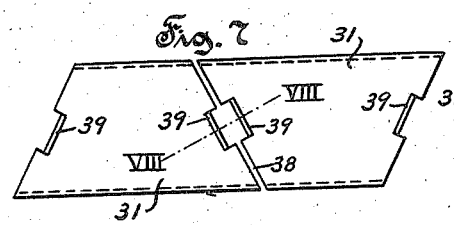
Fig. 7 is a plan view of another form of sectional central drive member for a screw conveyer, showing two successive sections thereof.
Figure 8:
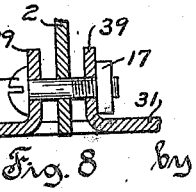
Fig. 8 is an enlarged transverse section through the fastening means for attaching a flight section to the central drive member, the section being taken along the line VIII—VIII of Fig. 7.

Referring specifically to Figs. 7 and 8 the sheet metal tubular members 31 have their ends cut at oblique angles relatively to the longitudinal axis of the members. Each of the tubular members 31 is provided with diametrically opposite parallel ears 39 formed integral with the tubular members and parallel to the ends thereof. The conveyer blades 2 are adapted to fit between the ends of the successive members 31 and may be clamped in position by means of clamping screws 7 passing through alined openings in the ears 39 and in the blade 2. With this form of tubular member 31 it is unnecessary to provide the positioning projection 15 and the locking set screws 13 as the successive tubular members 31 are automatically held against end displacement by the clamping screws 7 which lock the blades 2 in place. The blade 2 may be readily adjusted to reverse the direction of transportation of the material, by merely associating the same with the diametrically opposite end portions of the tubular members 31, which are likewise provided with ears 39 for permitting attachment of the blade 2 in reversed position.

By referring specifically to Fig. 8, it will be obvious that with the alined openings in the ears 39 and the blade 2 formed of such size to permit only free insertion of the clamping screw 7, distortion of the ears 39 toward the blade 2 will cause the axis of the bolt 7 to move inwardly toward the tubular members 31 thus drawing the conveyer blade inwardly toward the tubular members and urging the inner edge of the blade 2 against the pipe 4. This same action results in each of the several modifications disclosed and produces an efficient lock between the tubular members and the blade. The distortion of the ears 9, 19, 39 moreover serves to prevent displacement of the nuts 17, the spring in the material forming the ears, acting as a locking medium for preventing unscrewing of the nuts.

It will be noted that in each of the several modifications, the tubular members 3, 30, 31 as well as the blades 2 are formed of sheet metal and may be completely constructed with dies. While it is not essential to form the tube in sections or to provide a separate pipe 4, such structure adds flexibility to the conveyer. Similar elements are identical in form and structure and are therefore interchangeable. The fastening means for locking the blades 2 to the tubular members, are in each instance manipulable from the blade side of the tubular member and the blades 2 may be readily removed and resecured to the tubular members in order to reverse the direction of the transportation of the material.

It should be understood that it is not desired to limit the invention to the exact details of construction herein shown and described, for various modifications within the scope of the appended claims may occur to persons skilled in the art.

It is claimed and desired to secure by Letters Patent:

1. In combination, a member, a pair of spaced projections associated with said member, a blade associable with said member adjacent to said projections, and means for distorting said projections to urge said blade toward said member.

2. In combination, a member, a pair of spaced projections associated with said member, a blade associable with said member between said projections, said projections and said blade having alined openings therein, and means extending through said openings for distorting said projections to urge said blade toward said member.

3. In combination, a member, a pair of spaced flexible projections associated with said member, a blade associable with said member between said projections, and means for distorting said projections to urge said blade toward said member.

4. In combination, a member, a pair of spaced flexible projections associated with said member, a blade associable with said member between said projections, said projections and said blade having alined openings therein, and means within said openings for distorting said projections to urge said blade toward said member.

5. In combination, a member, a projection associated with said member, a blade associable with said member adjacent to said projection, and means for distorting said projection to urge said blade toward said member.

6. In combination, a member, a projection associated with said member, a blade associable with said member adjacent to said projection, said projection and said blade having alined openings therein, and means within said openings for distorting said projection to urge said blade toward said member.

7. In combination, a sheet metal member having a portion of the body thereof distorted to form a projection, a blade associable with said member adjacent to said projection, and means for distorting said projection to urge said blade toward said member.

8. In combination, a sheet metal member having a portion of the body thereof distorted to form a pair of spaced projections, a blade associable with said member between said projections, and means co-operable with said projections and said blade to distort said projections and urge said blade toward said member.

9. In combination, a sheet metal member having a portion of the body thereof distorted to form a pair of parallel spaced projections extending perpendicularly to the surface of said member, a blade associable with said member between said projections, and means co-operable with said projections and said blade to distort said projections and to urge said blade toward said member.

10. In combination, a member having a pair of spaced parallel projections and a second pair of remotely separated substantially parallel projections extending at an oblique angle to said first mentioned projections, a blade associable with said member adjacent to said first mentioned projections and engageable with said second mentioned projections, and means co-operable with said first mentioned projections and with said blade to retain said blade in engagement with said second mentioned projections.

11. In combination, a sheet metal member having its body distorted to form a pair of parallel spaced projections and a second pair of parallel projections extending at an oblique angle to said first mentioned projections, a plane blade associated with said member adjacent to said first mentioned projections and engageable with said second mentioned projections, and means co-operable with said first mentioned projections and with said blade to retain said blade in engagement with said second mentioned projections.

12. In combination, a member having a pair of longitudinally spaced projections and a second pair of laterally spaced projections, a blade associable with said member adjacent to said longitudinally spaced projections and engageable directly with said laterally spaced projections, and means co-operable with said longitudinally spaced projections and with said blade to retain said blade in engagement with said laterally spaced projections.

13. In combination, a member having a pair of longitudinally spaced projections and a second pair of laterally spaced projections located on opposite sides of longitudinally spaced projections, a blade reversibly associable with said member at said projections, and means co-operable with said projections and said blade to retain said blade in engagement with said laterally spaced projections.

14. In combination, a tubular member having a pair of longitudinally spaced projections and a second pair of laterally spaced projections all located on the same side of said tubular member, a semi-circular blade associable with said projections, and means co-operable with said longitudinally spaced projections and said blade to retain said blade in engagement with said laterally spaced projections.

15. In combination, a tubular sheet metal member having its body distorted to form a pair of longitudinally spaced projections lying in planes perpendicular to the axis of said member and other projections extending obliquely relatively to said axis, a blade associable with said member between said perpendicular projections and engageable directly with said oblique projections, and means co-operable with said perpendicular projections and said blade to retain said blade in engagement with said oblique projections.

16. In combination, a member having an axis and a pair of spaced projections perpendicular to said axis, said member having two sets of other projections extending at oblique angles relatively to said axis, a blade associable with said member adjacent to said perpendicular projections and interchangeably engageable with said sets of oblique projections, and means co-operable with said perpendicular projections and said blade to retain said blade in engagement with either set of said oblique projections.

In testimony whereof, the signature of the inventor is affixed hereto.

WALTER GEIST.